Feb. 19, 1929.
C. GLEERUP-MÖLLER
1,702,342
ELECTRIC DRIVING DEVICE FOR TALKING MACHINES
Filed March 24, 1926
2 Sheets-Sheet 1
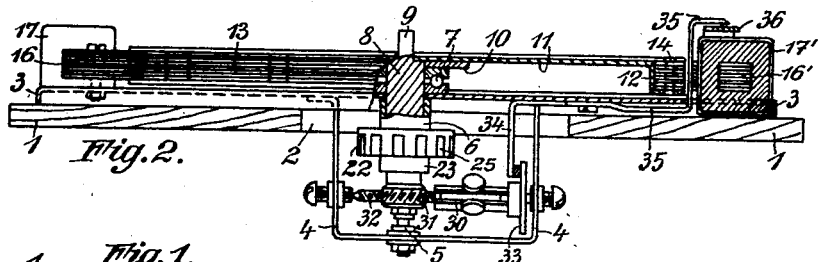
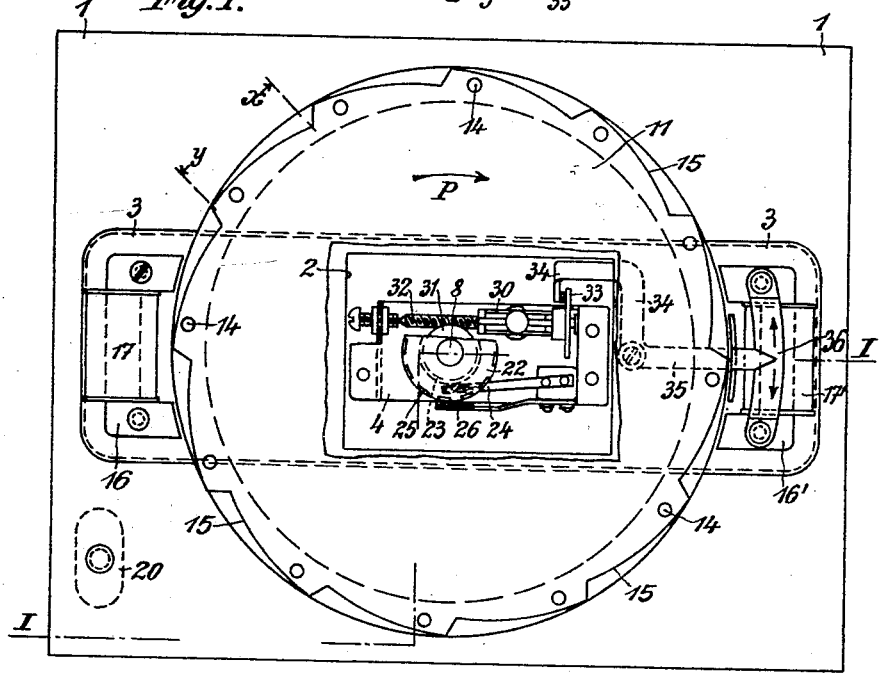
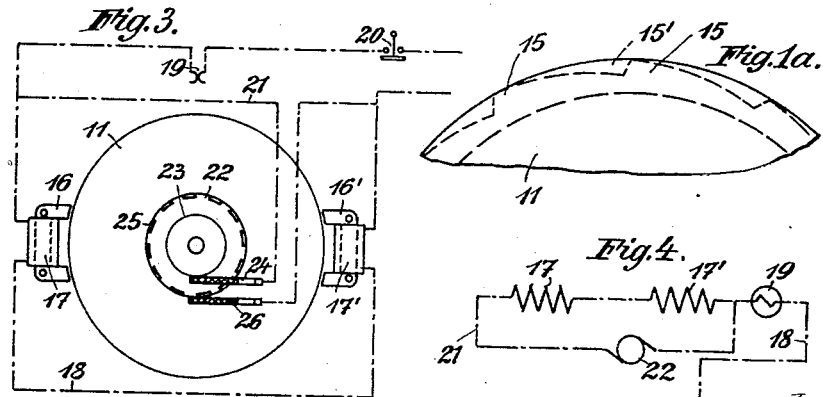
Inventor
C. Gleerup-Möller
by
Atty.

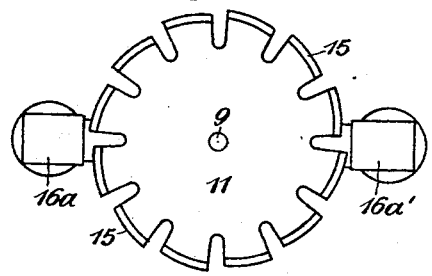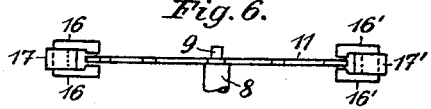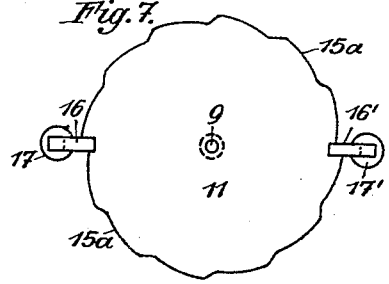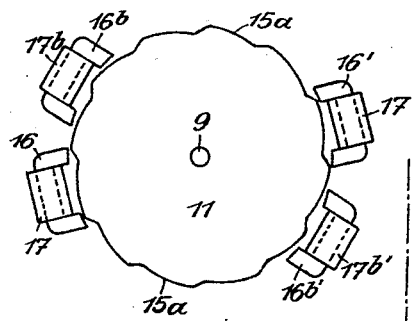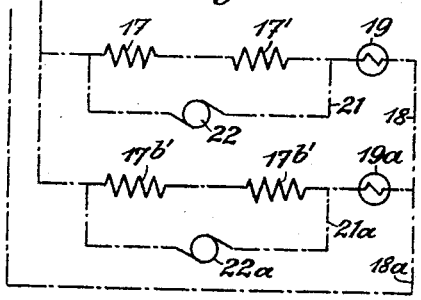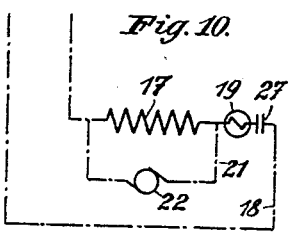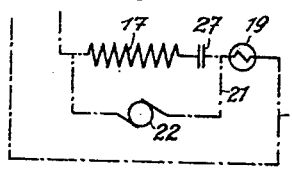

Patented Feb. 19, 1929.

1,702,342

UNITED STATES PATENT OFFICE.

CHRISTIAN GLEERUP-MÖLLER, OF HORSENS, DENMARK.

ELECTRIC DRIVING DEVICE FOR TALKING MACHINES.

Application filed March 24, 1926, Serial No. 97,103, and in Denmark April 8, 1925.

My invention relates to a device for the electric drive of talking machines. It is distinguished from the known electric driving devices for said machines in which a small electric motor is used, by the feature that a magnetic motor is provided, the rotor of which does not carry a coil, but has pole-forming projections or teeth which are attracted by the poles of an electromagnet or of electromagnets excited in certain intervals of time. The exciting current is interrupted in corresponding intervals with the aid of a short-circuiting circuit into which a suitable resistance, as for instance an incandescent lamp, is inserted, that resistance, or this lamp respectively, taking up the superfluous electric energy.

I am aware of the fact that magnetic motors are known, but as their efficiency is low they have no more been employed practically, but the high-speed electromotors have been made use of instead thereof. It is true that these latter motors excel the magnetic motors in various respects, but on the other hand they are also possessed of certain drawbacks which render the use of said motors for talking machines difficult, whereas the advantages which they present are of no particular advantage just for these machines. The drawbacks or disadvantages consist chiefly therein that the high-speed motors, more especially the armatures thereof, have a tendency to noises that are absolutely inadmissible for talking machines, require an expensive speeding-down gearing which also produces disturbing sounds, are likely to produce sparks, and must be chosen with consideration of the kind of current traversing the net, and of the voltage thereof. Finally, the small electric motors are expensive.

All said drawbacks are obviated, and all said disadvantages are overcome, by making use of magnetic motors as driving means for talking machines. If the number of the poles is chosen suited to the purpose no speed reducing gearing is necessary; in other words, the armature can be caused to run so slowly that its shaft may be coupled directly with the carrier of the record disk, neither the magnetic motor, nor the change-over switch producing then any disturbing noise. Instead of a separate carrier for the record disk, the armature itself may be employed for this purpose.

The magnetic motors can be run with direct or alternate current; besides, the cost-price of these motors is by far lower than that of the other motors, and the magnetic motors can be run with any voltage, the only requirement being the insertion of either a suitable resistance or a suitable condenser.

My invention is illustrated diagrammatically and by way of example in the accompanying drawings in which Figure 1 is a plan of the improved driving device for talking machines, the centre portion of the rotor 11 being broken away in order to show the arrangement and combination of parts located therebelow; Figure 1ª shows a portion of a modified rotor, or rotor disk respectively; Figure 2 is a vertical cross-section in the line I—I of Fig. 1; Figures 3 and 4 show wiring diagrams pertaining to the magnetic motor Figure 4 showing only one side of the supply line; Figure 5 shows another modification of the rotor disk and of the electromagnets actuating it, these magnets being single-polar instead of double-polar (as in Fig. 1); Figure 6 is a side-view of still another modification of the rotor disk and of the electromagnets, and Figure 7 is a plan of this modification; Figure 8 is a plan of a fourth modification; and Figures 9, 10, 11 and 12 are modified wiring diagrams which are also fully described hereinafter.

Referring to Fig. 1, 1 denotes the top panel of the casing (not shown) of a talking machine. 2 is a rectangular recess in the panel 1, and 3 a sheet-metal casing which is affixed to the upper surface of the panel and carries a bracket 4 extending downwardly through said recess. 8 denotes the talking machine shaft which is held in place by a step bearing 5, a neck journal bearing 6, and a ball-bearing 7, and 9 is a pivot-forming extension of the shaft and intended to receive the record-disk, as usually.

Immediately below said pivot, the shaft 8 is provided with a flange 10 to which is secured a circular disk 11 serving as support for the record disk, as well as rotor for the magnetic motor, and near its rim the disk 11 is provided with a downwardly directed ring 12 serving as abutment for superposed pieces 13 of soft sheet-iron of high permeability which form the poles of the armature and are shaped somewhat similar to ratchet teeth as shown at 15 in Fig. 1. The disk 12 is shaped correspondingly, and the teeth or poles 15 are secured to this sheet by bolts 14.

The teeth or poles 15 need not have at any rate just the shape shown in Fig. 1, but may have other shapes, as shown in Figs. 5 and 7. In each case the configuration of the teeth or poles is such that the edge $x$ (Fig. 1) is located nearer to the shaft 8 than is the edge $y$, whereby the starting torque produced by the poles 16, 16′ of the electromagnets 17, 17′ tends to turn the rotor disk 11 in the direction indicated by the arrow P in Fig. 1. The electromagnets are attached to the casing 3 in such a manner that the gap between their poles and the poles or teeth of the rotor disk is as small as possible.

Instead of arranging the poles or teeth 15 of the rotor disk 11 at the outer surface of the ring 12, they may be arranged at the inner surface thereof, in which case the electromagnets 16, 17 and 16′, 17′ are arranged between said poles or teeth and the shaft 8 of the talking machine, whereby the size of the space which the machine occupies is considerably diminished.

The coils 17, 17′ of the electromagnets are connected up to the net by wires 18, Fig. 3, and a resistance 19, as well as a cut-out 20, is inserted into one of said wires. The electromagnets may be of the horse-shoe type, as in Figs. 1, 6 and 8, or single-polar magnets may be used, as $16^a$ and $16^{a'}$ in Fig. 5, although this latter type is not so good as the other one because of its less effective lines of force. The shape of the rotor disk poles is then preferably that shown in Fig. 5. Concerning horse-shoe magnets, the position of their poles relatively to the rotor disk poles may also be that shown in Figs. 6 and 7 in which one of the two poles of each electromagnet 16, 16′ and 16′, 16″ is located above the rim of the rotor disk, and the other below this rim.

As the starting torque exerted upon the rotor disk poles is effective only from the point $x$, Fig. 1, to the point $y$, the rotor disk cannot commence to rotate automatically in any position, at least not as regards the constructional form of the device illustrated in Fig. 1, and it is, therefore, necessary to start the disk by hand. This is by no means a material disadvantage, but this manner of starting can be obviated by the provision of at least two pairs of electromagnets, as for instance, 16 and $16^b$ on one side of the rotor disk, and 16′ and $16^{b'}$ on the other side of the same (Fig. 8), the arrangement of the poles of these electromagnets relatively to the rotor disk poles being such that the disk commences to rotate automatically when the proper electromagnets are excited, viz, $16^b$ and $16^{b'}$, that is to say, in the position of the rotor disk shown in Fig. 8. After a certain angular rotation of the disk the other two electromagnets are being excited and so on, in continual alternation. If separate circuits as shown in Fig. 9 are provided for the coils $17^b$, $17^{b'}$ and 17, 17′ of the electromagnets, perfect certainty is attained that the rotor disk commences to start automatically at any position whatever.

In the constructional form illustrated in Figs. 2 and 3 a collar 23 is provided below the change-over switch 22 upon the shaft 8, and a brush 24 is in contact with said collar. Another brush 26 slides on and over the switch 22 which is provided with grooves 25 filled up with an insulating material. The number of these grooves is the same as that of the poles of the rotor disk. The position of the grooves 25 relatively to the rotor disk shoes is such that the brush 26 lies between two grooves upon the metal body of the rotatory switch 22 when the position of those rotor disk shoes which are just located in the proximity of the poles of the electromagnets is the most favorable one as regards the flux of the lines of force. As, at this position of the members mentioned, the short-circuiting circuit 21 Fig. 3, or the short-circuiting circuits 21 and $21^a$, Fig. 9 is closed, the coils of the electromagnets are currentless and the rotor disk continues to rotate by its inertia until the short-circuiting circuit is broken by the next insulating portion of the rotatory switch whereby the coils of the electromagnets are again energized. The current that is not utilized while the exciting coils are being short-circuited is taken up by the resistance lamp 19.

In the case of alternating current it is suited to the purpose to provide a condenser 27 Fig. 10 in the circuit 18 either in lieu of the resistance 19 or together with it or to provide the condenser 27 Fig. 11 in the shunt-circuit 21.

Besides the short-circuiting circuit 21 another short-circuiting circuit 28, Fig. 12, may be provided which is closed by a switch immediately after that moment in which the piece of music reproduced has been finished, this switch being actuated by the sound-box at the end of its way.

Regulating the speed of the rotor disk with the record disk may be effected in a variety of manners and by known means.

In the constructional form illustrated in Fig. 1 a centrifugal regulator 30 driven by the shaft 8 by the intermediary of a worm gearing 31, 32 is provided for that purpose. On the shaft of said regulator a brake disk 33 is provided which can be braked with different strength by means of rods 34 and 35, the free end of this latter rod being located over a graduated scale 36.

The teeth or poles of the rotor disk 11 can be secured to this disk also in other manners than that one shown in Figs. 1 and 2, and said disk may consist of any other material than iron, for instance of ebonite, a paper mass, aluminium, or the like. The disk may then have recesses in its rim into which the the teeth or pole-pieces are inserted, may be by pressing or, perhaps, by casting, and the interstices 15' (Fig. 1ª) between the projecting portions of said teeth or pole pieces may be filled up with a non-magnetic material, in such a manner, that the rotor disk is perfectly circular at its circumference as in Fig. 1ª.

The manner of operation of the device is as follows:

Supposing, the circuit 18 have been closed by means of the switch 20 (Fig. 3), the electromagnets 16, 16' or 16ª, 16ª' or 16ᵇ, 16ᵇ' will be excited intermittently, and the rotor disk 11 will rotate continually after having been started either by hand, as regards the constructional form illustrated in Figs. 1, 3, 5 and 6 or automatically, as also described. The proper speed of the rotation, as suited for the reproduction, is determined or regulated by the braking mechanism 33, 34, 35, 36.

I claim:

1. An electric driving device for talking machines having a shaft for the record disk, including a magnetic motor comprising a stator and a rotor, the stator comprising stationary electromagnets and the rotor comprising an element of non-magnetic material connected with the shaft for the record disk of the talking machine and having pole forming teeth to be successively attracted by the stator, a change-over switch attached to said shaft and adapted to short-circuit the electromagnetic coils, a shunt circuit in which said switch is arranged, and a resistance arranged in series with the switch and designed to prevent short-circuiting of the net voltage.

2. An electric driving device for talking machines having a record disk receiving shaft, including a magnetic motor comprising a stator and a rotor, the rotor comprising an element of non-magnetic material connected with the shaft and having pole forming teeth, the stator comprising stationary electromagnets arranged relative to the pole forming teeth to attract them to thereby rotate the element, a change-over switch connected to the shaft and arranged to short-circuit the electromagnets, a shunt circuit including said switch, a resistance arranged in series with the switch and designed to prevent short-circuiting of the net voltage, a second circuit forming a shunt to the exciting circuit, and a cut-out inserted into the second circuit to be actuated by the talking machine at the end of the production.

In testimony whereof I affix my signature.

CHRISTIAN GLEERUP-MÖLLER.